(12) United States Patent
Sfez et al.

(10) Patent No.: US 7,647,830 B2
(45) Date of Patent: Jan. 19, 2010

(54) METHOD AND APPARATUS FOR THE DETECTION OF OBJECTS UNDER A LIGHT OBSTRUCTING BARRIER

(75) Inventors: Bruno Sfez, Jerusalem (IL); Aner Lev, Modiin (IL)

(73) Assignee: Soreq NRC, Nahal Soreq, Yavne (IL)

( * ) Notice: Subject to any disclaimer, the term of this patent is extended or adjusted under 35 U.S.C. 154(b) by 247 days.

(21) Appl. No.: 11/813,287

(22) PCT Filed: Dec. 22, 2005

(86) PCT No.: PCT/IL2005/001369

§ 371 (c)(1),
(2), (4) Date: Jul. 3, 2007

(87) PCT Pub. No.: WO2006/072938

PCT Pub. Date: Jul. 13, 2006

(65) Prior Publication Data

US 2008/0163693 A1    Jul. 10, 2008

(30) Foreign Application Priority Data

Jan. 3, 2005    (IL)    ...... 166109
Sep. 8, 2005    (IL)    ...... 170760

(51) Int. Cl.
G01N 29/00    (2006.01)

(52) U.S. Cl. ........... 73/601; 73/656

(58) Field of Classification Search .......... 73/601, 73/627, 596, 608, 653, 656; 367/7, 87; 356/445, 356/479, 512, 502
See application file for complete search history.

(56) References Cited

U.S. PATENT DOCUMENTS

| | | | | |
|---|---|---|---|---|
| 3,594,583 A | * | 7/1971 | Sheldon | 250/210 |
| 3,711,823 A | * | 1/1973 | Green | 367/7 |
| 4,046,477 A | * | 9/1977 | Kaule | 356/35.5 |
| 5,305,759 A | * | 4/1994 | Kaneko et al. | 600/476 |
| 5,579,112 A | * | 11/1996 | Sugiyama et al. | 356/479 |
| 6,186,004 B1 | | 2/2001 | Kaduchak | |
| 6,415,666 B1 | | 7/2002 | Donskoy | |

FOREIGN PATENT DOCUMENTS

WO    03/089955    10/2003

* cited by examiner

*Primary Examiner*—Helen C. Kwok
(74) *Attorney, Agent, or Firm*—Dekel Patent Ltd.; David Klein

(57) ABSTRACT

A method for visualizing objects under light obstructing barriers of a target, the method including emitting an ultrasound wave and a laser wave towards a target, detecting a reflected laser wave is detected by optical means, analyzing the optical signal at the ultrasound frequency with demodulation means, generating ultrasonic image characteristics of the interaction of the ultrasound with the different layers of the target, and generating an optical image of the target obtained using optical imaging, wherein the ultrasonic image is fused with the optical image and the fused image is displayed on a display device.

12 Claims, 2 Drawing Sheets

METHOD AND APPARATUS FOR THE DETECTION OF OBJECTS UNDER A LIGHT OBSTRUCTING BARRIER

FIELD OF THE INVENTION

This invention relates generally to imaging techniques, and particularly relates to a method and apparatus for non-contact real-time imaging of objects under a light obstructing barrier. The invention utilizes a combination of light and ultrasound in order to detect and resolve underlying objects.

BACKGROUND OF THE INVENTION

There is an increased interest in non-contact systems that are able to visualize in real-time objects under a light obstructing barrier. The techniques are either relatively inexpensive, but are based on metal detection or can detect a broad range of materials, in particular soft materials, but are expensive and with limited range.

Ultrasound has been used in order to detect objects under clothes. In this technique, ultrasound is emitted towards a target, and the ultrasound echo is recorded. In a way similar to medical echography, all the different layers below the cloth are providing a weak echo, allowing reconstructing an image of the underlying object. This method has a quite limited range because of the strong attenuation of the ultrasound in the air. Moreover, and this is more critical, it has a very low resolution. In fact, there is a link between the attenuation and the resolution. Typically ultrasound in air is very strongly attenuated after a few meters for ultrasound frequencies above 30 kHz. This value corresponds to a resolution of approximately 1 cm. Therefore this technique has a limited range-resolution trade-off.

A problem often associated with the detection of said objects is the fact that the detection techniques often have a limited range, and can only detect said objects situated at proximity of the detection system (for example X-ray or computerized tomographic systems).

In the prior art, buried mines have been detected using a combination of sound and laser light. Most use a vibrometer, which is expensive and require the optical head to be in close contact with the object that is measured. Another technique uses two fibers in order to reduce the problem. However, this technique needs close contact to the target. The technique does not provide parallel detection and real-time image (scan of the laser). In addition, due to the use of ultrasonic reflection, the prior art technique has a limited range-resolution trade-off. For example, a choice must be made between ~1 cm resolution with limited range (apparently less than 1 meter) or 5 meters range with 10 cm resolution. Moreover, the use of ultrasonic pulses has another disadvantage: one may hear sound at the pulse frequency.

SUMMARY OF THE INVENTION

The present invention seeks to provide novel methods and apparatus for non-contact and real-time imaging of objects under a light obstructing barrier, as is described more in detail hereinbelow.

The invention aims to improve the range-resolution trade-off of the standard echography technique by combining ultrasound echography with optical detection. In one non-limiting embodiment, an ultrasonic wave is emitted towards the target, together with a laser beam. The ultrasonic echo from the object makes the outer surface or layer of the barrier vibrate. This vibration in turn is transmitted to the laser that gets phase-modulated by the vibration. The laser is detected by a very sensitive parallel detection apparatus that detects the signal at the ultrasound frequency. In parallel, the detection apparatus images the target. The two pictures are fused and the operator or an expert system analyzes the fused image of the standard image and the ultrasonic echo image.

BRIEF DESCRIPTION OF THE DRAWINGS

The present invention will be understood and appreciated more fully from the following detailed description taken in conjunction with the appended drawings in which.

DETAILED DESCRIPTION OF EMBODIMENTS

Figure 1:
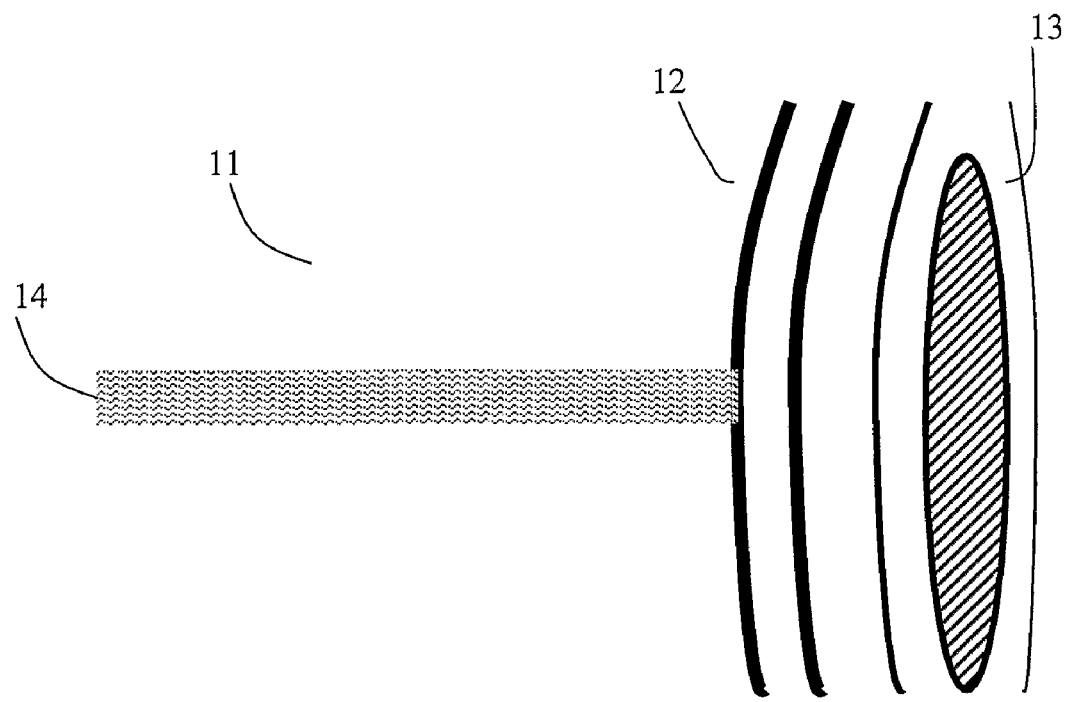
FIG. 1 shows one aspect of the invention. The laser beam 14 and the ultrasound wave 11 are impinging on the target 12. The ultrasound wave crosses different layers 12 that constitute the said barrier and is reflected back by the said object 13. The most outer layer vibrates because of the ultrasonic wave that comes back from the said object. The modulated light that is reflected back from the outer layer 12 contains modulation due to both the direct ultrasonic wave and to the reflected ultrasonic wave.

The principle of the invention is to detect the ultrasonic multiple reflections generated by the different layers that constitute the obstructing barrier covering the said object using the modulation of the light that is reflected back from the most external layer. This is illustrated in FIG. 1 where an ultrasonic wave 11 is sent towards a target 12 and 13, together with a laser wave 14. The ultrasonic wave can penetrate the said barrier and is reflected back at each interface. The laser wave cannot penetrate the barrier but is reflected back by the most external layer 12. When the ultrasonic wave is reflected by the inner layers, it makes the outer layer vibrate at the ultrasonic frequency after a certain delay corresponding to the time the ultrasound wave spends in the travel from the outer layer to the inner layers. The strength of the vibration depends on the reflection coefficient of the different inner layers. Therefore the reflected laser wave will be modulated more or less strongly depending on the strength of the reflected ultrasonic wave.

In order to retrieve the modulated signal, light from the target must be mixed with light from the same laser on the detector (named local oscillator). The mixing process has two major aims:

1) it amplifies the modulated signal
2) it shifts the frequency of the modulated light (which lays in the hundreds of terahertz range) to the frequency of the ultrasound.

Usually, this heterodyning process is performed with a local oscillator that is derived from the laser itself, and is mixed with the signal. This leads to additional hardware and is not optimal in this particular case.

In a preferred embodiment, light from the target itself is used as a local oscillator. Indeed light that is reflected back by the most outer layer is only slightly modulated by the ultrasonic wave. Most of the light is not modulated at all. It can therefore serve as a local oscillator that amplifies the modulated signal (auto-heterodyning). A major advantage of this heterodyning process (compared with a local oscillator directly derived from the laser) is that the local oscillator and the signal propagate along the same optical path go and forth until the target. The mixing therefore removes atmospheric fluctuations that would spoil the signal to noise ratio. A second advantage of the auto-heterodyning is that the coherence length of the laser can be relatively small. In the standard heterodyning process, it must be at least twice the laser-target distance.

After the heterodyning process, the useful signal is located at the ultrasound frequency that acts now as a carrier in an amplitude modulation scheme. This demodulation process must be performed independently for each pixel. Different implementations of this demodulation process are described below.

When the ultrasonic and the laser waves are scanned over the entire target, an image can be obtained that displays the ultrasonic reflection strength at each region of the target, therefore providing an ultrasonic image of the target.

Scanning Procedure

In order to obtain an image, two-dimensional data have to be retrieved. In order to do so, there are several different embodiments:

1) scan a focused ultrasound and a small diameter laser beam over the target and use a single detector 2) send a large area ultrasound wave covering all the target and scan a small diameter laser beam and use a single detector 3) send a large area ultrasound wave and a large area laser beam covering all the target, and perform a parallel optical detection of the modulated light signal In the first embodiment, both the focused ultrasound and the laser beam are scanned on the target. Low ultrasound powers can be used since all the power is concentrated on a small region. The target range has to be known in order to determine the angular limits of the scans. The ultrasonic scan can be performed using a mechanical scan or using phase-array elements.

In the second embodiment, the ultrasound wave is spread over the whole target, so that no ultrasonic scan is required. Only the laser scan is performed. This is particularly useful when the scanning laser wavelength is in a range where no simple detectors arrays are available, or when these arrays are expensive. This is also useful when only low power lasers are available for this range of wavelength or for eye safety.

In the third and preferred embodiment, both the ultrasound and the laser light are spread over the whole target, and a camera is used as an array of detectors for parallel detection. In that case, video rates can be obtained and no scanning apparatus is needed for the ultrasound and the light. The process of demodulation using a parallel detection scheme is described below.

When the ultrasonic and the laser waves are scanned over the said target, an image can be obtained that displays the ultrasonic reflection strength at each region of the target, therefore providing an ultrasonic image of the target. Alternatively, a parallel detection scheme can be implemented with a camera where each pixel can synchronously detect modulated signal.

Demodulation Procedure

In order to illustrate the demodulation principle, we will consider what happens on one single optical detector. We will also consider only two main ultrasonic reflections: one on the outer layer and one on the said object beneath the said barrier. We will neglect all other reflections (such as on other barrier layers). The more general case of multiple relevant reflections can be easily generalized.

The signal S on the detector can be written:

$$S = DC + a \cdot \cos(wt) + b \cdot \cos(wt+q)$$

Where DC is a signal that is constant, a the optical signal corresponding to the amplitude of the ultrasonic vibration reflected by the outer layer, b the optical signal corresponding to the amplitude of the ultrasonic vibration reflected the said object, w is the ultrasonic angular frequency, t is the time and $q = 2 w t_0$, where $t_0 = d/v$ is the time necessary for the ultrasound wave to travel from the said outer layer to the said object, d is the distance between them, and v is the speed of sound.

The deconvolution process aims to measure a, b and d from the measurement of the signal in real time. The most interesting parameters are b and d since they correspond respectively to the reflection strength and to the depth of the said object.

The deconvolution process consists in multiplying the signal by the function $g(t) = \cos(wt + theta)$ and integrating the result over a long enough period of time. Theta represents the phase (unknown) of the modulation function relative to the phase of the signal. An equivalent process may be used to open a gate for a short time two or four times per period (defined as $2\pi/w$), accumulating the signal for each phase (therefore obtaining respectively two and four data). In the later case, one obtains (for the case of the four phases):

$$S1 = S(theta) = (a + b \cdot \cos(q))\cos(theta) + b \cdot \sin(q) \cdot \sin(theta)$$

$$S2 = S(theta+\pi) = -(a + b \cdot \cos(q))\cos(theta) - b \cdot \sin(q) \cdot \sin(theta)$$

$$S3 = S(theta+\pi/2) = (a + b \cdot \cos(q))\sin(theta) - b \cdot \sin(q) \cdot \cos(theta)$$

$$S4 = S(theta+3\pi/2) = -(a + b \cdot \cos(q))\sin(theta) + b \cdot \sin(q) \cdot \cos(theta)$$

The value of $(S2-S1)^2 + (S4-S3)^2 = 4(a^2 + b^2 + 2ab \cdot \cos(q))$ is independent of theta. If b is large compared to a (for example in the case of reflection on metallic object) then the signal is approximately $4b^2$ and the variations in the signal reflect the variations in b.

In order to determine b and d specifically, it is possible to modulate the ultrasound frequency w (chirp), or to use two different frequencies and solve the algebraic set of equations.

A preferred embodiment is to obtain these data for a slightly different ultrasound (and demodulation) frequency. The advantage is that usually the ultrasonic transducer will have a very close response if the modulation frequency is near to the original one. By subtracting the signals at both frequencies and dividing by the frequency difference, the derivative of the former expressions are obtained:

$$S'1 = S'(theta) = -(b' \cdot \sin(q))\cos(theta) + b' \cdot \cos(q) \cdot \sin(theta)$$

$$S'2 = S'(theta+\pi) = -(b' \cdot \sin(q))\cos(theta) - b' \cdot \cos(q) \cdot \sin(theta)$$

$$S'3 = S'(theta+\pi/2) = -(b' \cdot \sin(q))\sin(theta) - b' \cdot \cos(q) \cdot \cos(theta)$$

$$S'4 = S'(theta+3\pi/2) = (b' \cdot \sin(q))\sin(theta) + b' \cdot \cos(q) \cdot \cos(theta)$$

Where S' means the derivative of S with regards to w, and $b' = 2bd/v$.

The value of $(S'2-S'1)^2 + (S'4-S'3)^2$ is now $(b' \cdot \sin(q))^2$, and the ratio $(S'2-S'1)/(S'4-S'3)$ is $\tan(theta-q)$. Therefore the value of q relative to theta can be simply evaluated, as well as the value of b. The value of q relative to theta gives the relative depth of the said object, and the value of b informs about its mechanical characteristics.

Demodulation Physical Implementation

As described before, the demodulation can be physically implemented using a single detector (in the case where the laser itself is scanning the target) or with an array of detectors. We are now examining the different possibilities.

Implementation 1: with One Single Detector

In the case of one single detector, the detected optical signal is amplified and converted to digital signal using an analog to digital electronic card. The signal at the ultrasound frequency is then retrieved using the algorithm described before, or other standard technique based on Fourier transform techniques. Then the algorithm described before is applied to determine the different parameters (a, b, and d).

Implementation 2: with One Camera Sensor.

The detection system makes use of a parallel lock-in detection scheme. The basic concept of this detection is that each pixel can detect the modulated signal out of the continuous signal, since the modulated signal only contains information on the ultrasound-light interaction. In order to do so there are typically two different embodiments:

In the first embodiment, a camera with a fast frame rate (at least twice the frame rate of the ultrasound frequency) is used as a sensing element. The images are captured synchronously with the ultrasound frequency and downloaded at twice or four times per cycle. The algorithm described above is then applied In a second embodiment, special purpose cameras are used. These cameras ("lock-in cameras") are based on CMOS technology and use several registers per pixel, with a high frame rate. Such cameras include the lock-in camera sensor developed by Seitz. Frequency modulation in excess of 20 MHz can be obtained. The different phases are accumulated in the registers, and the data are repetitively downloaded to the central processing unit (usually a FPGA chip), where the algorithms described above is implemented.

In a third embodiment, a CCD sensor is used and the lock-in detection is done internally at the pixel level. This can be done by using a standard high definition camera sensor, and operate the two registers associated to each pixel using adequate clock programming. Each register acts as a memory. During the first part of the ultrasonic cycle, generated photoelectrons are stored in one register, and in the second part of the cycle, photoelectrons are stored in the second register. At each ultrasonic cycle photoelectrons are accumulated in the different registers. After several such cycles, data are downloaded from the sensor and two images are retrieved, corresponding to the two phases of the ultrasonic cycle. This technique is well-known in the art (Takai). Then the algorithm described above can be applied.

Figure 2:
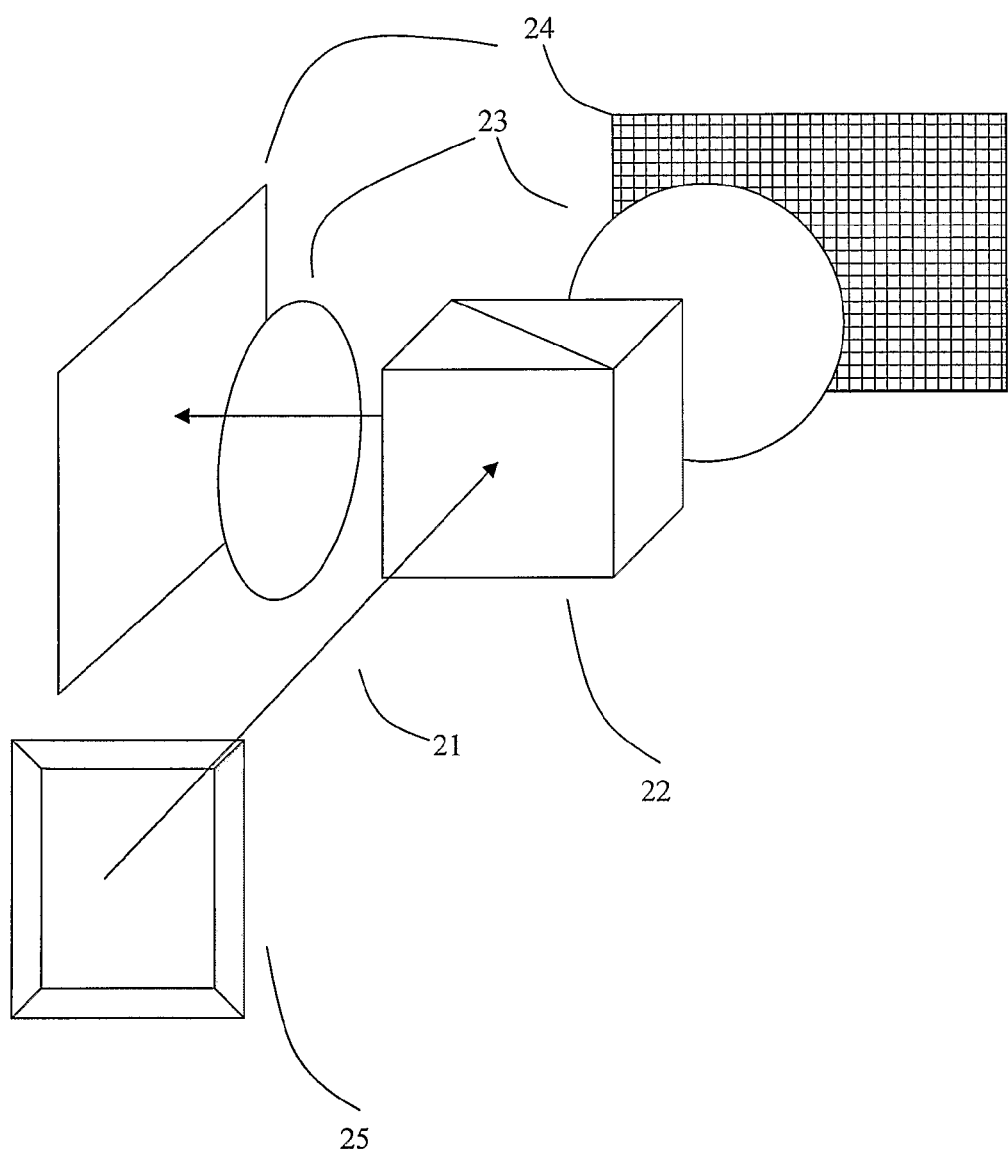
FIG. 2 shows another aspect of the invention. The light beam 21 reflected by the target impinges on a non-polarizing beam splitter 22. Each beam is focused on a different sensor 24. These sensors are open or closed alternatively at the ultrasound frequency. Alternatively, the beam 21 is linearly polarized at the angle 45 degrees, and a polarization transformer 25 switches the polarization so that it is horizontal or vertical, at the ultrasound frequency. The beam-splitter 22 is a polarizing beam-splitter and light is directed towards one or the other sensor alternatively at the ultrasound frequency.

Implementation 3: with Two Camera Sensors:

The use of two different sensors is illustrated in FIG. 2. A beam of laser light 21 passes through a beam-splitter and at each arm, light is focused onto a sensor (both sensors have as close as possible optical and electronics characteristics) so that equal light is impinging on both sensors.

The preferred embodiment is to use the internal shutter of the camera sensor. The electronic shutters of both sensors are alternatively opened and closed at the ultrasonic frequency. After a certain number of such cycles, the images are downloaded, and processed according to the previously described algorithm.

If such an access to the sensor shutter is not possible, a second embodiment is to use a polarizing beam splitter instead of the non-polarizing cube, and introduce before the cube a polarization rotating element, which are well-known in the art (for example: liquid crystal, electrooptic or elastooptic modulator). By switching the polarization at a frequency twice the ultrasonic frequency, laser light is directed towards one or the other sensor at the requested frequency, and is integrated on each sensor.

Modes of Operation

According to the way the data is processed, different kinds of information can be derived. In all these cases the ultrasonic wave and the laser wave are continuous or quasi-continuous.

In the first mode the derivation process is not used, and the signal does not inform about the shape of the said object, but merely about its presence. The signal obtained at the detector (after processing) is $4a(a+b \cdot \cos(2wd/v))$. As précised above, the signal obtained at the detector will follow the value of b if d is much smaller than twice the ultrasonic wavelength, i.e. if d is much smaller than 5 mm for an ultrasound frequency of 30 kHz. The signal will therefore follow the value of the reflection strength of the said object.

In the second mode, the derivation process is implemented and both the values of b and of d are retrieved according to the algorithm described above. Practically, the operations are the following, for each pixel:

1) Tune the ultrasound frequency to w and the gating frequency to 2w (for a 2 phases scheme) or 4w (for a four phases scheme)

2) Accumulate 2 or 4 phases as described above during an integration time T and store them in memories A1 to A4

3) Tune the ultrasound frequency to w+δw and the gating frequency to 2(w+δw) (for a 2 phases scheme) or 4(w+δw) (for a four phases scheme)

4) Accumulate 2 or 4 phases as described above during an integration time T and store them in memories B1 to B4

5) For all the phases, perform the operation $S'_i = (B_i - A_i)/\delta w$, $i = 1 \ldots 4$.

6) Retrieve b and d as indicated above

When the procedure is performed for all the pixels (obtained either using a scan of the laser and ultrasound or using a parallel detection scheme), images can be obtained where at each pixel two kinds of information can be obtained: the reflection strength of the said object and its relative depth. Together with the two-dimensional information, this gives a four dimensional picture of the object (x, y, z and reflection strength).

In the third mode, the ultrasound frequency is scanned over a relatively large scanning span, and the reflection strength is determined for each ultrasound frequency. For each pixel a spectrum is therefore generated, which characterizes the mechanical properties of the object. Since the information is relative (only b is modified during a ultrasound frequency scan), the formula $S = a(a+b \cdot \cos(2wd/v))$ can be applied (without the need of the derivation procedure). Once the spectrum is determined at a specific point, it is compared to a look-up table of spectra, and the material of the object is determined (the material of the said object is the material whose ultrasonic spectrum is the closest to the spectrum determined during the measurement).

Signal Processing

After demodulation, an image is obtained. This grey-level image has some noise and it is difficult for the operator to clearly distinguish the hidden object. Different enhancement techniques can be used for improving the image clarity. One preferred implementation is to determine the maximum and minimum levels of the signal in the image and determine a threshold below which no signal is displayed and above which the signal is displayed (binary representation). This threshold can be adapted either automatically (for example according to the range) or manually by the operator.

In the second mode, two different images are obtained: one corresponding to the reflection coefficient and the second to the depth. A correlation of these two images can be performed, pointing out the presence of the object.

The third mode is similar to the first and second mode, except that the ultrasonic wave frequency is scanned over a certain frequency region. The spectral signature of the reflected light is directly related to the reflection strength of the ultrasonic wave. Therefore information on the kind of materials that compose the said object can be determined in that way. When used in conjunction with the first or second mode of operation, it is not necessary to perform a complete scan of the target, but rather a small number of points on the target are enough in order to determine the kind of material which composes the said object.

Fusion with Video

When the signals S1 to S4 are summed up, the non-modulated signal is obtained. This is the standard optical signal. Therefore both the modulated and the non-modulated images are simultaneously obtained in that way. Both images can be fused together in order to give the operator a better way to appreciate the target. In case for some reason the summation of the different phases is not possible, a second camera can be brought in the system, with a good registration with the synchronous camera, in order to provide the fused images.

The fusion with the video image allows removing artifacts. The operator or an expert system can check that a strong acoustic reflection comes from an obvious region of the barrier itself and therefore correct for that.

Applications

There are several types of applications that can benefit from this invention.

In a first embodiment, the apparatus is hand-held and mobile. The operator uses the system as a camera that can be brought to the target.

In a second embodiment, the system is located at a fixed location and is continuously providing target images that are analyzed by a distant operator or by an expert system.

It is appreciated that various features of the invention which are, for clarity, described in the contexts of separate embodiments, may also be provided in combination in a single embodiment. Conversely, various features of the invention which are, for brevity, described in the context of a single embodiment, may also be provided separately or in any suitable subcombination.

What is claimed is:

1. A method for visualizing objects under light obstructing barriers of a target, the method comprising:
   emitting an ultrasound wave and a laser wave towards a target;
   optically detecting a reflected laser wave;
   analyzing an optical signal associated with said reflected laser wave at a demodulated ultrasound frequency associated with said ultrasound wave;
   generating characteristics of an ultrasonic image of interaction of the ultrasound wave with different layers of the target; and
   generating an optical image of the target obtained using optical imaging, wherein the ultrasonic image is fused with the optical image and the fused image is displayed on a display device.

2. The method according to claim 1, wherein the optical and modulation means comprise a lock-in camera synchronized with the ultrasound frequency.

3. The method according to claim 2, wherein auto-heterodyning is performed at a camera sensors plane.

4. The method according to claim 1, wherein the ultrasound wave is continuous and ultrasonic contrast is visualized.

5. The method according to claim 1, wherein two different images are obtained at two different ultrasound frequencies, and the depth and the reflection coefficients are retrieved by solving a set of algebraic equations.

6. The method according to claim 1, wherein two different images are obtained at two slightly different ultrasound frequencies, and the depth and the reflection coefficients are retrieved according to the following procedure:
   tuning the ultrasound frequency to w and the gating frequency to 2w (for a 2 phase scheme) or 4w (for a four phase scheme);
   accumulating 2 phases (for a two phase scheme) or 4 phases (for a four phase scheme) during an integration time T and storing the two or four phases in memories A1 to A4;
   tuning the ultrasound frequency to w+δw and the gating frequency to 2(w+δw) (for a 2phase scheme) or 4(w+δw) (for a four phase scheme);
   accumulating 2 phases (for a two phase scheme) or 4 phases (for a four phase scheme) during an integration time T and store the two or four phases in memories B1 to B4;
   for all the phases, performing the operation $S'_i=(B_i-A_i)/\delta w$, $i=1\ldots 4$; and
   retrieving b and d using the values of $(S'2-S'1)^2+(S'4-S'3)^2$ and $(S'2-S'1)/(S'4-S'3)$, wherein b is the optical signal corresponding to the amplitude of the ultrasonic vibration reflected from an object located in said target under a light obstructing barrier, and d is the distance between an outer layer of said baffler and said object.

7. The method according to claim 4, wherein the ultrasound wave is tuned over a wide frequency range, the ultrasonic contrast is determined as a function of the ultrasonic frequency, and a nature of an object located in said target under a light obstructing barrier is determined using a look-up table.

8. The method according to claim 1, wherein a threshold is computed and only regions of the ultrasonic image where the signal is higher than the threshold are displayed.

9. The method according to claim 1, wherein a reflection strength image and an object shape image are generated and a correlation image is displayed.

10. Apparatus for visualizing objects under a light obstructing barrier of a target, the apparatus comprising:
    an ultrasound wave emitter and a laser wave emitter;
    optical means for detecting reflected laser radiation;
    demodulation means for the analysis of an optical signal detected by said optical means at an ultrasound frequency of an ultrasound wave emitted by said ultrasound wave emitter;
    means for generating characteristics of an ultrasonic image of interaction of the ultrasound wave with different layers of a target; and
    optical imaging means for generating an optical image of the target, wherein the ultrasonic image is fused with the optical image and the fused image is displayed on a display device.

11. Apparatus according to claim 10, wherein the demodulating means comprises a lock-in camera that uses several registers per pixel to store different phases of the signal, and a sensor computing unit operative to process two or four phases of the signal.

12. Apparatus according to claim 10, wherein the demodulation means comprises two camera sensors and a means to open one sensor or the other at a frequency twice the ultrasonic frequency, so as to provide two different images that are subtracted one from the other, the difference being squared and averaged.

* * * * *